United States Patent [19]
Christensen et al.

[11] Patent Number: 5,385,137
[45] Date of Patent: Jan. 31, 1995

[54] U-TUBE HEAT EXCHANGER FOR BAKERY OVENS

[75] Inventors: George M. Christensen; Donald D. Weyer, both of Sumner, Wash.

[73] Assignee: The Lucks Company, Seattle, Wash.

[21] Appl. No.: 141,262

[22] Filed: Oct. 21, 1993

[51] Int. Cl.⁶ .......................................... F24C 15/32
[52] U.S. Cl. ............................. 126/21 R; 126/21 A; 126/91 A; 432/152; 165/162
[58] Field of Search ............. 126/21 R, 21 A, 110 R, 126/110 A, 110 AA, 109, 99 A, 72, 98, 91 A; 165/905, 178, 168, 162, 157, 81, 82, 73; 432/152, 199, 147

[56] References Cited
U.S. PATENT DOCUMENTS

| 3,324,844 | 6/1967 | Huffman | 126/21 A |
|---|---|---|---|
| 3,509,939 | 5/1970 | Weber | 165/162 |
| 3,526,274 | 9/1970 | Gardner | 165/162 X |
| 3,545,537 | 12/1970 | Hill, Jr. | 165/162 |
| 3,590,803 | 7/1971 | Sauer | 126/21 A |
| 3,605,717 | 9/1971 | Sauer | 126/21 A |
| 3,719,180 | 3/1973 | Pere | 126/21 A |
| 3,926,106 | 12/1975 | Deusing et al. | 26/21 A X |
| 4,867,132 | 9/1989 | Yencha | 126/21 R X |
| 5,165,889 | 11/1992 | Baggott | 126/21 A X |

OTHER PUBLICATIONS

Conventional technology relating to heat exchangers, as disclosed in the above identified patent application (no date).
"Despatch" heat exchanger device (no date).
"Bumble Bee" heat exchanger device (no date).

Primary Examiner—Larry Jones
Attorney, Agent, or Firm—Gregory W. Moravan

[57] ABSTRACT

An easily repairable, high efficiency, durable, compact heat exchanger having a modular heat exchanger tube may be provided. The modular heat exchanger tube may be easily disassembled so that any of its modular component tubes (such as its combustion area tube) may be easily removed for repair or replacement. Internal alignment and sealing sleeves may be provided for the adjacent modular component tubes of the heat exchanger tube. The internal sleeves may automatically and permanently increase their sealing power due the automatic and permanent expansion they undergo when they are stress relieved by being heated for the first time by the combustion gasses within the heat exchanger tube. Stress cracking of the heat exchanger tube may be reduced by supporting the heat exchanger tube so that it may move freely as it heats up (expands) and cools down (contracts) during the normal thermal operating cycles of the heat exchanger. The energy efficiency of the blower for the heat exchanger may be increased by providing a low resistance air path within the heat exchanger. A passive, secondary ignition point device located downstream from the flame bullet within the heat exchanger may increase the thoroughness of the combustion of the fuel within the heat exchanger tube, thereby increasing the amount of energy extracted from the fuel, while simultaneously reducing the amount of pollutants produced by the combustion of the fuel. The heat exchanger's compactness may be increased by using a folded or formed heat exchanger tube which may not utilize any heat exchange fins.

16 Claims, 4 Drawing Sheets

U-TUBE HEAT EXCHANGER FOR BAKERY OVENS

BACKGROUND OF THE INVENTION

The present invention relates to heat exchangers. More particularly, it relates to an air cooled U-tube heat exchanger for bakery ovens and cooking ovens.

SUMMARY OF THE INVENTION

The one-piece heat exchanger tubes in many conventional heat exchangers are susceptible to failure from at least two causes. First, the heat exchanger tubes may burn out or corrode, due to the high temperatures and combustion gasses which they may encounter during use of the heat exchanger. Second, they may fail due to cracks caused by the mechanical stresses or flexing produced by temperature changes as the heat exchanger tubes heat up (expand) and cool down (contract) due to their normal thermal operating cycles. The failure of any particular one-piece heat exchanger tube may be a relatively costly and time consuming proposition, since typically the entire one-piece heat exchanger tube must be removed, thrown away and replaced.

Accordingly, one aspect of the present invention may be to provide a heat exchanger tube which may be of a modular construction; to enable any of its modular component tubes (and in particular, its combustion area tube), to be easily removed for repair or replacement. Thus, if any of its modular component tubes should fail for any reason, the entire heat exchanger tube does not have to be removed, thrown away and replaced.

However, if a heat exchanger tube of modular construction is provided, then it may be become important to provide assembly means for quickly, easily, inexpensively and reliably aligning, sealing and releasably assembling the joints between its adjacent modular component tubes. Accordingly, another aspect of the present invention may be to provide such assembly means which may comprise dual purpose internal sleeves which both align and seal the joints between the heat exchanger tube's adjacent modular component tubes.

It is conventional knowledge that when the manufacturing stresses in metals are relieved, as by heating them, the metals may tend to automatically and permanently expand slightly. For example, with respect to the assembly means' internal sleeves, such manufacturing stresses may arise from at least three sources. First, they may arise from the fabrication of the material itself, such as the sheet metal or tubular metal, from which the internal sleeves are made. Second, such manufacturing stresses may arise during the forming of the internal sleeves from such material; such as if the internal sleeves are bent or welded when they are formed. Third, such manufacturing stresses may arise during the installation of the internal sleeves; such as if the internal sleeves are compressed or welded when they are used to assemble together the heat exchanger tube's modular component tubes.

Accordingly, a further aspect of the present invention may be to utilize such stress relief induced expansion of the internal sleeves to automatically and permanently increase their sealing power when they are exposed to the heat which they encounter during the normal operation of the heat exchanger tube. This may be accomplished by intentionally not relieving some or all of the internal sleeves' manufacturing stresses, and/or by intentionally imparting manufacturing stresses to the internal sleeves, prior to their being used for the first time during operation of the heat exchanger tube. Then, after the internal sleeves are used to assemble together the heat exchanger tube's modular component tubes, the heat which the internal sleeves encounter during the normal operation of the heat exchanger tube may automatically and permanently relieve such manufacturing stresses in the internal sleeves, thereby automatically and permanently expanding the internal sleeves. Such expansion of the internal sleeves may automatically and permanently force them into tighter engagement with their respective modular component tubes of the heat exchanger tube, thereby automatically and permanently increasing the sealing power of the internal sleeves.

As was mentioned above, one reason why a heat exchanger tube may fail is due to cracks caused by the mechanical stresses or flexing produced by temperature changes as the heat exchanger tubes heat up (expand) and cool down (contract) during their normal thermal operating cycles. Accordingly, another aspect of the present invention may be to minimize, or even eliminate, such cracks by supporting the heat exchanger tube in its housing with support means which permit the relatively free and unrestricted movement of the heat exchanger tube with respect to its housing as the heat exchanger tube heats up (expands) and cools down (contracts) during its normal thermal operating cycles.

In a further aspect of the present invention, such support means may comprise at least one hanger means for suspending the heat exchanger tube from its housing; wherein the hanger means is not affixed to the housing, but is permitted to move with respect to the housing, to enable the relatively free and unrestricted movement of the heat exchanger tube with respect to its housing during the heat exchanger tube's normal thermal operating cycles.

Since space is always at a premium, it may be desirable that any heat exchanger be as compact as possible, so that it may be more conveniently installed either as a free standing unit, or as part of another device, such as a baking oven. Accordingly, another aspect of the present invention may be to provide a heat exchanger having a U-shaped, or otherwise folded, heat exchanger tube, so that any given length of heat exchanger tube will occupy a shorter space.

A further aspect of the present invention may be to provide a relatively compact heat exchanger by using a finless, relatively large diameter heat exchanger tube, and a relatively high rate of air flow over the heat exchanger tube, so that bulky and expensive heat exchanger fins are not needed.

Energy efficiency is always important. Accordingly, another aspect of the present invention may be to prove a heat exchanger having a relatively low resistance air path; so that for any particular desired air flow rate, a smaller blower may be used than might otherwise be the case. Aspects of the present invention which may contribute to such a low resistance air path may be providing a heat exchanger tube not having any heat exchanger fins; using a backward incline fan; and/or providing a blower plenum which at least substantially, if not entirely, surrounds the fan, to permit the relatively unrestricted flow of air away from the fan.

Making the combustion of the fuel within the heat exchanger tube as complete as possible is desirable since it not only increases the amount of energy extracted from any given amount of fuel, but it also reduces the amount of pollutants emitted by the heat exchanger tube. Accordingly, another aspect of the present invention may be to provide the heat exchanger tube with a highly reliable, passive, secondary ignition means for more complete combustion of the fuel within the heat exchanger tube. The secondary ignition means may also offer the advantage of providing more complete combustion of the fuel, even if the heat exchanger tube is provided with a fuel/air mixture which is richer than may be optimal. The passive secondary ignition means may comprise at least one rod means, and may be located within the heat exchanger tube a short distance downstream from the flame bullet, so that it may be heated to an incandescent operating temperature by the combustion gasses.

The heat exchanger tube in the heat exchanger of the present invention may convey any hot fluid, such as a hot liquid or a hot gas.

Although, by way of example, the U-tube heat exchanger of the present invention may be usable for a bakery oven, it is understood that the present invention may be used to provide heat for any other device.

It should be understood that the foregoing summary of the present invention does not set forth all of its features, advantages, characteristics, structures, methods and/or processes; since these and further features, advantages, characteristics, structures, methods and/or processes of the present invention will be directly or inherently disclosed to those skilled in the art to which it pertains by the following, more detailed description of the present invention.

DESCRIPTION OF THE PREFERRED EMBODIMENTS

Referring now to the figures, the heat exchanger of the present invention is shown generally designated at 10.

The heat exchanger 10 may include a heat exchanger tube 12 which comprises an inlet tube 14, a combustion area tube 16, a U-shaped tube 18, and two exhaust tubes 20, 22.

Although the tubes 12-22 are illustrated as having the same diameter, they need not have the same diameter. Although the tubes 16 and 22 are illustrated as being of the same length, their lengths may be different. Although the tubes 18 and 20 are illustrated as being of the same length, their lengths may be different. Although the U-shaped tube 18 is illustrated as having been welded together from a pair of elbows 24 and three straight portions 26; it may be formed in any other suitable way, such as by bending it from a single straight piece of tubing, or by casting it in one piece.

Preferably, the heat exchanger tube 12 may be of modular construction, in that its modular component tubes 14-22 may be assembled together in any suitable way, such as by the use of three pairs of L-shaped clamp angles 28 at each joint between the tubes 14-22. Each pair of clamp angles 28 may be held together by any suitable fasteners 30, such as by a nut and a bolt. Although three, equally spaced pairs of clamp angles 28 are illustrated for each joint, there may be fewer or more pairs of clamp angles 28, and the clamp angles 28 need not be equally spaced. Alternatively, any other suitable form of releasable clamping or securing means may be utilized to assemble the tubes 14-22 together.

It may be preferred that the tubes 14-22 be releasably assembled together for at least two reasons. First, such a construction enables any of the tubes 14-22 (and, in particular, the combustion area tube 16), to be easily removed for repair or replacement, as needed. This may be an important feature of the present invention, since typical conventional heat exchangers may have a one-piece heat exchanger tube. Thus, if any portion of such a conventional one-piece heat exchanger tube should become burned out, corroded, damaged, or otherwise rendered unfit for use, the entire conventional one-piece heat exchanger tube would have to be removed and replaced, which may be a relatively costly, difficult and time consuming job. In distinct contrast, any of the modular component tubes 14-22 of the modular heat exchanger tube 12 may be quickly and easily removed and replaced at a relatively low cost should the need arise.

The second reason why it may be preferred that the tubes 14-22 be releasably assembled together is that doing so may increase the life of the tubes 14-22, as compared to a conventional one-piece heat exchanger tube. This is because the assembled joints between the adjacent tubes 14-22 may permit some degree of movement between the adjacent tubes 14-22, as they expand and contract with respect to each other during each thermal operating cycle of the heat exchanger 10. Such movement may help to provide stress relief between the tubes 14-22, thereby helping to prevent the cracking which might otherwise occur if the heat exchanger tube 12 was a conventional one-piece heat exchanger tube.

From the forgoing, it will be appreciated that the present invention may be much more reliable; may have a much longer service life; may have a much shorter down time for repair; may be much easier to repair; and may be much less expensive to repair; as compared to a conventional heat exchanger having a conventional one-piece heat exchanger tube.

The reliability and repairability of the heat exchanger tube 12 of the present invention may be very important since a typical use of the present invention may be to provide heat for a commercial baking oven. As is well known, bakery goods, unlike most other consumer goods, cannot be stored for any significant period of time without suffering serious quality degradation, but must be baked fresh daily, or even more frequently, for highest quality. Thus, the loss of one or more ovens in a commercial bakery for an extended period of time while a conventional one-piece heat exchanger tube is being removed and replaced, may be a major problem. This is because it may mean extensive lost production; which, in turn, may even result in the loss of customers, due to an inability to fill their orders for freshly baked goods in a timely fashion.

However, even though it is not preferred, as an alternative, two or more of the tubes 14-22 of the present invention may be welded together, or formed from one piece of tubing.

A dual purpose, internal sleeve 32 may be provided for each of the joints between the tubes 14–22. The sleeves 32 may be dual purpose since they may help hold the adjacent tubes 14–22 in alignment with each other when the tubes 14–22 are being assembled together. In addition, the sleeves may also help to prevent any leakage of combustion gasses from the joints between the tubes 14–22 during operation of the heat exchanger 10. Each sleeve 32 may be sized to have an external diameter which is slightly smaller than the internal diameter of the tubes 14–22, so that each sleeve 32 will fit snugly within its respective tubes 14–22.

Each sleeve 32 may be formed in any suitable way. For example, a sleeve 32 may be made by first cutting off a short piece of tubing from the same tubing which was used to make the tubes 14–22. The short piece of tubing may then have a longitudinal section removed from its sidewall, to form a short piece of split tubing. The width of the longitudinal section may be selected such that when the short piece of split tubing is formed into a cylinder, it will have an external diameter which is slightly smaller than the internal diameter of the tubing 14. Lastly, the short piece of split tubing may be welded along its longitudinal seam to form the final sleeve 32.

Alternatively, a sleeve 32 may be made by first cutting a suitable piece of material from a flat piece of sheet metal stock; and then bending, or otherwise forming it, into the desired cylindrical shape. Such use of flat stock to form the sleeves 32 may not be preferred, as compared to the use of a split piece of tubing which was described above. This is because it may be relatively difficult to accurately form flat sheet metal stock into the desired cylindrical shape, particularly when heavy gauge metal stock is used; while the split piece of tubing is relatively easy to compress into the desired cylindrical shape because it tends to retain its original cylindrical curvature.

When the sleeves 32 and the tubes 14–22 are assembled together, it may be preferred that any leakage of combustion gasses through the joints between the sleeves 32 and the adjacent tubes 14–22 be inherently minimized, if not eliminated; while still permitting the tubes 14–22 to be quickly and easily disassembled from each other for repair or replacement. To help achieve this end, it may be preferred that a circumferential weld be used to secure the upstream end of each sleeve 32 inside of the downstream end of its a respective one of the tubes 14–20; while the downstream end of each sleeve 32 may then be simply slipped into the upstream end of its respective adjacent downstream tube 16–22.

The terms "upstream" and "downstream" are used herein with respect to the direction of the flow of the combustion gasses within the heat exchanger tube 12, which is from the combustion area tube 16 to the exhaust tube 22.

An explanation of the installation, theory and operation of the sleeve 32 for the joint between the tubes 14, 16 will now be given; it being understood that the same comments may apply equally well to the rest of the sleeves 32 and their respective tubes 16–22.

Regarding the sleeve 32 for the joint between the tubes 14, 16, its upstream end may be welded to the inside of the lower, downstream end of the tube 14. Then, to assemble the tube 14 to the tube 16, the free, downstream end of the sleeve 32 may be inserted into the upstream end of the tube 16; and then the tubes 14, 16 may be secured together by use of the clamp angles 28 and the fasteners 30. The tubes 14, 16 may be disassembled just as easily, by simply removing the fasteners 30 from the clamp angles 28, and by then pulling the tube 16 off from the downstream end of the sleeve 32.

The use of a circumferential weld between the sleeve 32's upstream end and the tube 14's downstream end may be preferred since it may help to prevent the sleeve 32's upstream end from channeling any of the combustion gasses outside of the tube 14. If, instead, there were a circumferential weld between the sleeve 32's downstream end and the tube 16's upstream end, then the sleeve 32's free upstream end may tend to stick out into the flow of combustion gasses to some degree, and may tend to channel some of the combustion gasses outside of the tube 14.

However, it may be surprising that a circumferential weld may be used to secure the sleeve 32's upstream end to the tube 14's downstream end, since it may ordinarily be expected that such a weld may tend to cause manufacturing stresses which, in turn, may cause the sleeve 32's downstream end to tend to leak with respect to the tube 16's upstream end.

This is because, when two metal objects are welded together, such manufacturing stresses may tend to cause the two metal objects to "draw" to some degree; that is, to tend to shrink or contract along the line at which they are welded together. However, any such shrinkage or contraction may be undesirable, since it may tend to cause a reduction in the diameter of the sleeve 32's downstream end; which, in turn, may tend to permit combustion gasses to leak from the tube 16's upstream end.

However, it has been discovered that achieving a relatively leak-proof fit between the sleeve 32's downstream end and the tube 16's upstream end may not only be possible, but may actually be enhanced by the use of use of a circumferential weld to secure the sleeve 32's upstream end to the tube 14's downstream end.

This is because it has been discovered that during use of the heat exchanger 10, the first time the circumferential weld between the sleeve 32' upstream end and the tube 14's downstream end is heated by the combustion gasses within the heat exchanger tube 12, the "draw" in that circumferential weld may tend to be permanently relieved, thereby permitting the sleeve 32 to permanently expand to some degree, even when the heat exchanger tube 12 cools off. This, in turn, may tend to cause the sleeve 32's downstream end to tend to permanently expand into a tighter sealing engagement with the tube 16's upstream end, even when the heat exchanger tube 12 cools off, thereby tending to prevent any leakage of the combustion gasses out between the sleeve 32's downstream end and the tube 16's upstream end.

In addition, it has also been discovered that the first time the sleeve 32 is heated by the combustion gasses within the heat exchanger tube 12 may also tend to permanently relieve the manufacturing stresses in the sheet metal or tubular metal from which the sleeve 32 may be made. Such manufacturing stresses may be inherently imparted to the sheet metal or tubular metal during the manufacture of the sheet metal or tubular metal at the steel mill. Such relief of the manufacturing stresses in the sheet metal or tubular metal from which the sleeve 32 may be made may also tend to permit the sleeve 32 to permanently expand to some degree when it is heated for the first time, even when the heat exchanger tube 12 cools off. This, in turn, may cause the sleeve 32's sidewall to tend to permanently expand into a tighter sealing engagement with the inside of the tube 16, even when the heat exchanger tube 12 cools off, thereby tending to prevent any leakage of the combustion gasses between the sleeve 32 and the tube 16.

Third, it has also been discovered that the first time the sleeve 32 is heated by the combustion gasses within the heat exchanger tube 12 may also tend to permanently relieve the manufacturing stresses which may have arisen during the production of the sleeve 32, particularly if the sleeve 32 is made from sheet or tubular metal which is bent or welded during the production of the sleeve 32. Such relief of the manufacturing stresses in the sleeve 32 may tend to permit the sleeve 32 to permanently expand to some degree, even when the heat exchanger tube 12 cools off. This, in turn, may tend to cause the sleeve 32's sidewall to tend to permanently expand into a tighter sealing engagement with the inside of the tube 16, even when the heat exchanger tube 12 cools off, thereby tending to prevent any leakage of the combustion gasses between the sleeve 32 and the tube 16.

In addition, the material from which the sleeve 32 is made may be intentionally selected to have a coefficient of thermal expansion which is greater than that of the material from which its respective downstream tube 16 is made. Then, when the sleeve 32 is heated by the combustion gasses within the heat exchanger tube 12, the sleeve 32 may tend to expand to a greater degree than will its respective downstream tube 16. This, in turn, may cause the sidewall of the sleeve 32 to tend to expand into a tighter sealing engagement with the inside of its respective tube 16, for so long as the heat exchanger tube 12 is hot.

However, although the sleeve 32 would be expected to expand during operation of the heat exchanger 10, due to the coefficient of thermal expansion of the metal used to form the sleeve 32, it may be dangerous to rely solely on such thermal expansion of the sleeve 32 for sealing purposes for at least three reasons. First, the amount of such thermal expansion, and thus the amount of sealing provided by such thermal expansion, may vary from zero to a maximum, and then back again to zero, during each of the numerous thermal cycles of the heat exchanger 10 during normal operation. It is apparent that there will be little or no sealing providing by such thermal expansion when the amount of such thermal expansion is zero, or is small.

Second, it may be dangerous to rely solely on such thermal expansion of the sleeve 32 for sealing purposes since the expansion of the sleeve 32 caused by such thermal expansion is not permanent; but is, instead, lost each time the sleeve 32 cools off during the normal operation of the heat exchanger 10.

Third, if the internal sleeve 32 and its tube 16 are made from materials which have the same coefficient of thermal expansion, there will be no increase in the seal between the internal sleeve 32 and the tube 16 when they are heated, since the sleeve 32 and the tube 16 will expand about the same amount. In addition, if the sleeve 32's coefficient of thermal expansion is less than that of the tube 16, the seal between the sleeve 32 and the tube 16 will actually weaken. This is because, in such a case, the tube 16 may tend to expand away from the sleeve 32 when they are heated.

Alternatively, although it may not be preferred, instead of using a circumferential weld to secure the sleeve 32's upstream end to the tube 14's downstream end, a circumferential weld may be used between the sleeve 32's downstream end and the tube 16's upstream end. Alternatively, mechanical fasteners, welds, and/or gaskets may be used to secure one or both ends of the sleeve 32 inside one, or both, of the tubes 14, 16. Alternatively, the sleeve 32 may be located on the exterior of the tubes 14, 16, rather than on their interiors. Alternatively, the sleeve 32 may be eliminated, and the tube 14's downstream end may be necked down so that it would fit inside of the tube 16's upstream end; the tube 16's upstream end may be enlarged so that the tube 14's downstream end would fit within it; the adjacent ends of the tubes 14, 16 may be provided with complimentary flanges and gaskets; or the adjacent ends of the tubes 14, 16 may be joined together in any other suitable way, such as by using a threaded connection, or by using any other suitable conventional form of mechanical connection means.

Input heat may be provided for the heat exchanger tube 12 in any suitable way. For example, a fuel/air mixture may be provided to the heat exchanger tube 12 from any suitable fuel/air input equipment, and then burned within the combustion area tube 16. Any suitable liquid or gaseous fuel may be used, such as oil, natural gas, or propane.

The fuel/air input equipment may be mounted to the heat exchanger tube 12 in any suitable way. For example, a mounting member 52 may be provided which may comprise four fuel/air input equipment mounting bolts 54, a top flange 56, and a delivery tube 58. The mounting member 52 may be secured to the heat exchanger tube 12 in any suitable way, such as by using a mounting screw 60. The fuel/air input equipment may then be mounted to the mounting member 52 in any suitable way, such as by use of the mounting bolts 54 in conjunction with four nuts.

During operation of the heat exchanger 10, the fuel/air mixture from the fuel/air input equipment is conveyed by the delivery tube 54 to the combustion area tube 16, where combustion takes place.

Alternatively, the heat exchanger tube 12's inlet tube 14 and the delivery tube 54 may be eliminated, and the fuel/air input equipment may be mounted directly to the upstream end of the combustion area tube 16 with the four mounting bolts 54 and the top flange 56. Alternatively, the mounting member 52 may be eliminated, and the fuel/air input equipment may be mounted within, or form a part of, the heat exchanger tube 12. Alternatively, the fuel may be burned upstream from the heat exchanger tube 12, with the hot combustion gasses then being delivered to the heat exchanger tube 12.

Figure 5:
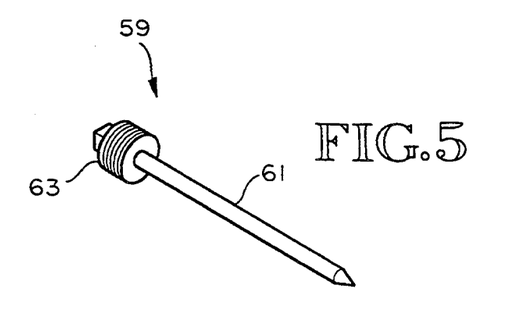
FIG. 5 is a perspective view of the present invention's secondary ignition point device 59.

Preferably, the combustion area tube 16 may be provided with a passive secondary ignition point device 59 which is located inside of the combustion area tube 16, downstream from the flame bullet which is emitted from the delivery tube 58 during operation of the heat exchanger tube 12. The secondary ignition point device 59 may comprise a secondary ignition rod 61 which is mounted to the combustion area tube 16 in any suitable way. For example, the rod 61 may be secured in an axial bore in a threaded plug 63, which is then threadedly connected to the combustion area tube 16, so that the rod 61 is held in place in the desired location within the combustion area tube 16. Preferably, the rod 61 is located on a diameter of the combustion area tube 16, so that it is oriented perpendicularly to the flow of the combustion gasses within the combustion area tube 16.

The rod 61 may be formed from any suitable heat and corrosion resistant substance, such as a metal (e.g., stainless steel), or a ceramic material.

During operation of the heat exchanger tube 12, the secondary ignition rod 61 may be heated to an incandescent temperature by the flow of the combustion gasses, so that the incandescent rod 61 may then act as a secondary ignition source for any residual combustibles and oxygen which may remain in the combustion gases at that point. The secondary ignition rod 61 may provide at least three advantages.

First, the rod 61 may reduce the amount of pollutants, such as carbon monoxide (CO), which are emitted by the heat exchanger tube 12. Second, the rod 61 may increase the efficiency of the heat exchanger tube 12, in that it may maximize the amount of BTU's which the heat exchanger tube 12 is able to deliver for any given input amount of fuel. Third, the rod 61 may help to overcome a situation in which the combustion area tube 16 is receiving a fuel/air mixture from the delivery tube 58 which is richer than may otherwise be optimal. That is, the rod 61 may tend to cause even an initially overrich initial fuel/air mixture to be more completely burned.

By way of example, the secondary ignition rod 61 may comprise a stainless steel rod which is about ⅛th of an inch in diameter; which extends into the combustion area tube 16 about 2 and ⅜ths of an inch; and which is located about 8 inches downstream from the delivery tube 58's flame bullet. Alternatively, the rod 61 may be shorter or longer; there may be more than one rod 61; the rod 61 may have its surface area increased, such as by the use of fins or other protuberances; and some or all of the rod 61 may extend at any angle with respect to the flow of combustion gasses within the heat exchanger tube 12. The term "rod 61" is defined to mean any secondary ignition means which extends into the stream of combustion gasses downstream of the flame bullet, regardless of its size and shape; and may even include, for example, a material which is perforated or honeycombed.

The heat exchanger tube 12 may be provided with any suitable damper means for helping to regulate the speed, and thus the dwell time, of the combustion gasses within the heat exchanger tube 12. If the combustion gasses pass too quickly through the heat exchanger tube 12, then wasteful energy losses may occur, since there may be insufficient time for the heat exchanger 10 to extract the optimum amount of heat from the combustion gasses before they exit the heat exchanger tube 12.

On the other hand, if the combustion gasses pass too slowly through the heat exchanger tube 12, then the total quantity of heat which the heat exchanger 10 is able to extract from the combustion gasses in any given unit of time may be less than the minimum amount which is needed by the oven or other equipment to which the heat exchanger 10 is delivering heat.

For example, a suitable damper means may be an exhaust damper 64 which may comprise a handle 66, a rod 68, and a number of semicircular damping plates 70 which are located on alternating sides of the rod 68. There may be a relatively snug friction fit between the damping plates 70 and the inside of the exhaust tube 22. The exhaust damper 64 may be held in place within the exhaust tube 22 by any suitable means, such as by an interference fit between the exhaust tube 22's internal sleeve 32 and the damper 64's bottom damping plate 70. The damper 64's handle 66 may aid in the damper 64's easy insertion into, and removal from, the exhaust tube 22. During operation of the heat exchanger tube 12, the damper 64's alternating damping plates 70 force the combustion gasses to travel a sinuous path within the exhaust tube 22, thereby slowing their speed. By suitably varying the size, shape, number and spacing of the damper plates 70, the flow of the combustion gasses within the heat exchanger tube 12 may be held to any desired predetermined speed for any given fuel/air input rate.

The combustion gasses may be conveyed away from the exhaust tube 22 in any suitable way, such as by connecting an exhaust stack (not illustrated) to the exhaust tube 22 with an adapter collar 72. The collar 72 may be connected to the exhaust tube 22 in any suitable way, such as by use of a screw 74. Alternatively, the exhaust stack may be secured directly to the exhaust tube 22 in any suitable way, such as by welding it thereto. Alternatively, the exhaust tube 22 may be exhausted directly into the atmosphere, thereby eliminating the collar 72 and the exhaust stack entirely.

In addition to the heat exchanger tube 12, the heat exchanger 10 may further comprise a front wall 34, a back wall 36, a left wall 38, a right wall 40, a bottom wall 42, a blower closing plate 44, a ceiling panel 46, a burner side air control wall 48, and an exhaust side air control wall 50.

The back wall 36, left wall 38, right wall 40, and bottom wall 42 may be formed in any suitable way; such as by forming them from one or more pieces of sheet metal, which are then secured together as needed in any suitable way, such as by welding or by the use of fasteners. Preferably, one or more of the walls 36–42 may comprise portions of the walls of the oven or other equipment which is to receive heat from the heat exchanger 10. Alternatively, the heat exchanger 10 and all of its components may form a freestanding unit.

The blower closing plate 44 may comprise a mounting flange 76, an air inlet hole 78; a hole 80 for the inlet tube 14; and a hole 82 for the exhaust tube 22. The blower closing plate 44 may be secured to the back wall 36 in any suitable way, such as by the use of any suitable fasteners (not illustrated) which pass through mounting holes provided in its mounting flange 76. A U-shaped reinforcing channel member 83 may be secured in any suitable way, such as by welding, to the bottom of the front portion of the blower closing plate 44. The channel member 83 may have a notch 85, so that the channel member 83 will not obstruct the air inlet hole 78 in the blower closing plate 44.

The ceiling panel 46 may comprise a blower access hole 84; a hole 86 for the inlet tube 14; a hole 88 for the exhaust tube 22; and a rim 90 around the blower access hole 84, to which the blower cover 92 may be mounted. The rim 90 may be formed in any suitable way, such as by securing four pieces of U-shaped channel metal around the periphery of the blower access hole 84 in any suitable way, such as by welding it thereto. A reinforcing rib 87 may be secured in any suitable way, such as by welding, to the top of the front portion of the ceiling panel 46.

The blower cover 92 may comprise a body 95 and a pair of flanges 97. The blower cover 92's body 95 may be sized to fit within the ceiling panel 46's blower access hole 84, with its flanges 97 resting on top of the front and rear edges of the blower access hole 84's rim 90. The blower cover 92 may be held in place in any suitable way, such as by the use of screws which extend into the blower cover 92's body 95 through mounting holes 99 in the blower access hole 84's rim 90.

Figure 4:
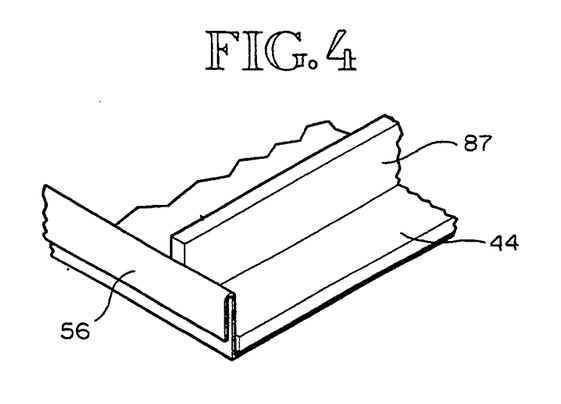
FIG. 4 is a perspective view of one corner portion of the invention's ceiling panel 46.

The ceiling panel 46 may be mounted to the rest of the heat exchanger 10 in any suitable way. For example, the back edge 94 and the side edges 96 of the ceiling panel 46 may be bent into an inverted U-shape (as best seen in FIG. 4), so that they may engage the tops of the heat exchanger 10's back and side walls 36, 40 and 42, respectively; after which they may then all be secured together in any suitable way, such as with screws. The inverted U-shape of the back and side edges 94, 96 may also serve to reinforce the back and side edges 94, 96.

The heat exchanger tube 12 may be mounted within the heat exchanger 10 in any suitable way. However, it should be noted that there may be a large amount of thermal expansion and contraction of the heat exchanger tube 12 during its normal thermal operating cycles during use of the heat exchanger 10. For example, let us assume that the heat exchanger 10 is providing heated output air of about 850° F.; and that the heat exchanger tube 12 has an overall height of about 84.25 inches, and an overall width of about 35 inches at room temperature. Then, during each of the heat exchanger tube 12's thermal cycles, it may increase and decrease its overall height by about 1 inch; and it may increase and decrease its overall width by about 3/16ths of an inch.

Thus, an important feature of the present invention may be to provide a heat exchanger tube 12 which is stressed as little as possible as it repeatedly heats up (expands) and cools down (contracts) during use; since such stresses may otherwise result in the relatively early cracking and failure of the heat exchanger tube 12. Accordingly, it is preferred that such stresses are at least minimized, if not entirely prevented, by mounting the heat exchanger tube 12 in any suitable way within the heat exchanger 10 so as to not restrict the natural tendency of the heat exchanger tube 12 to move as it repeatedly expands and contracts during use.

For example, the blower closing plate 44's holes 80, 82, and the ceiling panel 46's holes 86 and 88 may be sized large enough so that even when the inlet tube 16 and the outlet tube 22 are fully expanded and fully contracted, the blower closing plate 44 and the ceiling panel 46 do not substantially restrict the movement of the heat exchanger tube 12.

In addition, the heat exchanger tube 12 may be mounted within the heat exchanger 10 in such a way that it is not rigidly affixed to the rest of the heat exchanger 10; but is, instead, permitted to move at least substantially freely with respect to the rest of the heat exchanger 10, as the heat exchanger tube 12 expands when it heats up and contracts when it cools down during use of the heat exchanger 10.

For example, the heat exchanger tube 12 may be mounted to the rest of the heat exchanger 10 by the use of a pair of hangers 98, each of which may comprise a collar 100 and a pair of mounting angles 102. The mounting angles 102 may be secured to their respective collars 100 in any suitable way, such as by welding. The mounting angles 102 may, in turn, be secured to their respective inlet tube 16 or exhaust tube 22 in any suitable way, such as by the use of a screw 104, or by welding. The use of a removable fastener 104 to secure the mounting angles 102 to the inlet tube 16 and the exhaust tube 22 may be preferred, in order to permit the easy disassembly and replacement of the inlet tube 16 and the exhaust tube 22, should the need arise.

Preferably, the hangers 98 may not be affixed to the ceiling panel 46; but may be, instead, held there simply by the force of gravity and by the weight of the heat exchanger tube 12 which they support. In such an event, the hangers 98 may be sized larger than their respective holes 86, 88 in the ceiling panel 46, so that the hangers 98 cannot be pulled down through the holes 86, 88 by the weight of the heat exchanger tube 12. In addition, the holes 86, 88 may be sized large enough to permit the maximum amount of movement which a completely unrestrained heat exchanger tube 12 would be expected to experience during its normal thermal operating cycles.

As may now be appreciated, if the hangers 98 are not affixed to the ceiling panel 46 they may permit the inlet and exhaust tubes 14, 22 (and thus the entire heat exchanger tube 12) to move substantially freely with respect to the rest of the heat exchanger 10. This is because such unaffixed hangers 98 may be free to slide over the top surface of the ceiling panel 46 in response to the expansion and contraction of the heat exchanger tube 12 during use of the heat exchanger 10. Alternatively, although not preferred, the hangers 98 may be affixed to the ceiling panel 46, or to some other part of the heat exchanger 10.

Alternatively, although circular, one-piece collars 102 are illustrated, the collars 102 may have any other suitable size and shape, and may even be segmented. Alternatively, although two right angle mounting angles 102 are illustrated, there may be fewer or more mounting angles 102, and each mounting angle 102 may have any other suitable size and shape. Alternatively, the collars 102 may be eliminated and their function of supporting the heat exchanger tube 12 on the ceiling panel 46 may be performed in any suitable way, such as by allowing the horizontal part of each mounting angle 102 to rest directly on the ceiling panel 46. In such an event, the size and shape of the horizontal part of each mounting angle 102 may be chosen so as to not exceed the pounds per square inch carrying capacity of the ceiling panel 46.

Alternatively, instead of hangers 98, the heat exchanger tube 12 may be mounted in the heat exchanger 10 in any other suitable way which will permit the heat exchanger tube 12 to move substantially freely with respect to the rest of the heat exchanger 10 as the heat exchanger tube 12 expands and contracts during use of the heat exchanger 10. For example, the heat exchanger tube 12 may be mounted with springs or connectors to the ceiling panel 46, or to some other part of the heat exchanger 10.

Each of the heat exchanger 10's air control walls 48, 50 may be of any suitable construction. For example, each air control wall 48, 50 may be formed from one piece of material and may have a generally Z-shaped cross sectional configuration with a flat central panel 106, a flat rear flange 108 and a flat front flange 110. Mounting holes 112 may be provided in the flanges 108, 110.

Figure 1:
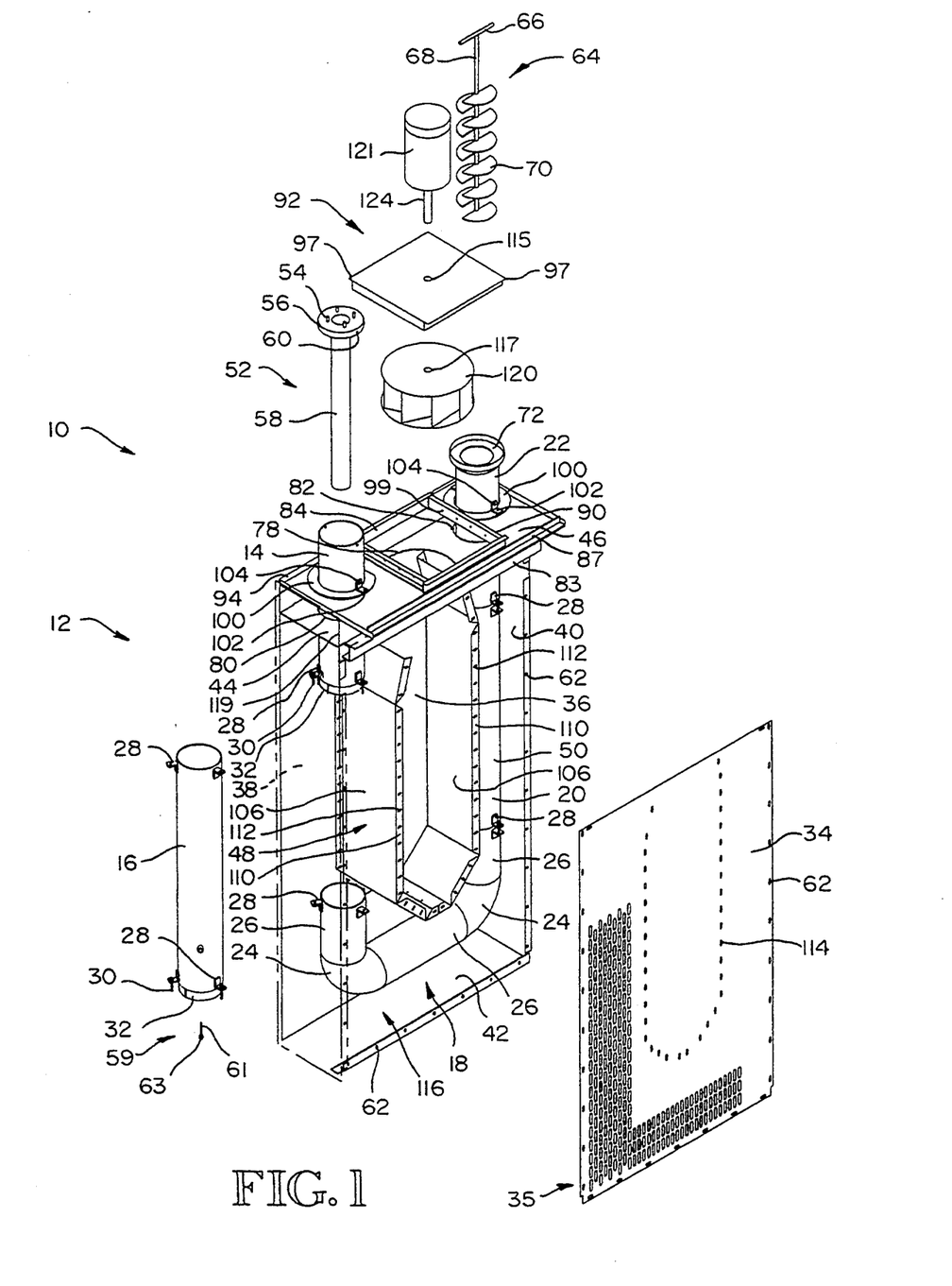
FIG. 1 is a partially exploded perspective view of the present invention.
Figure 2:
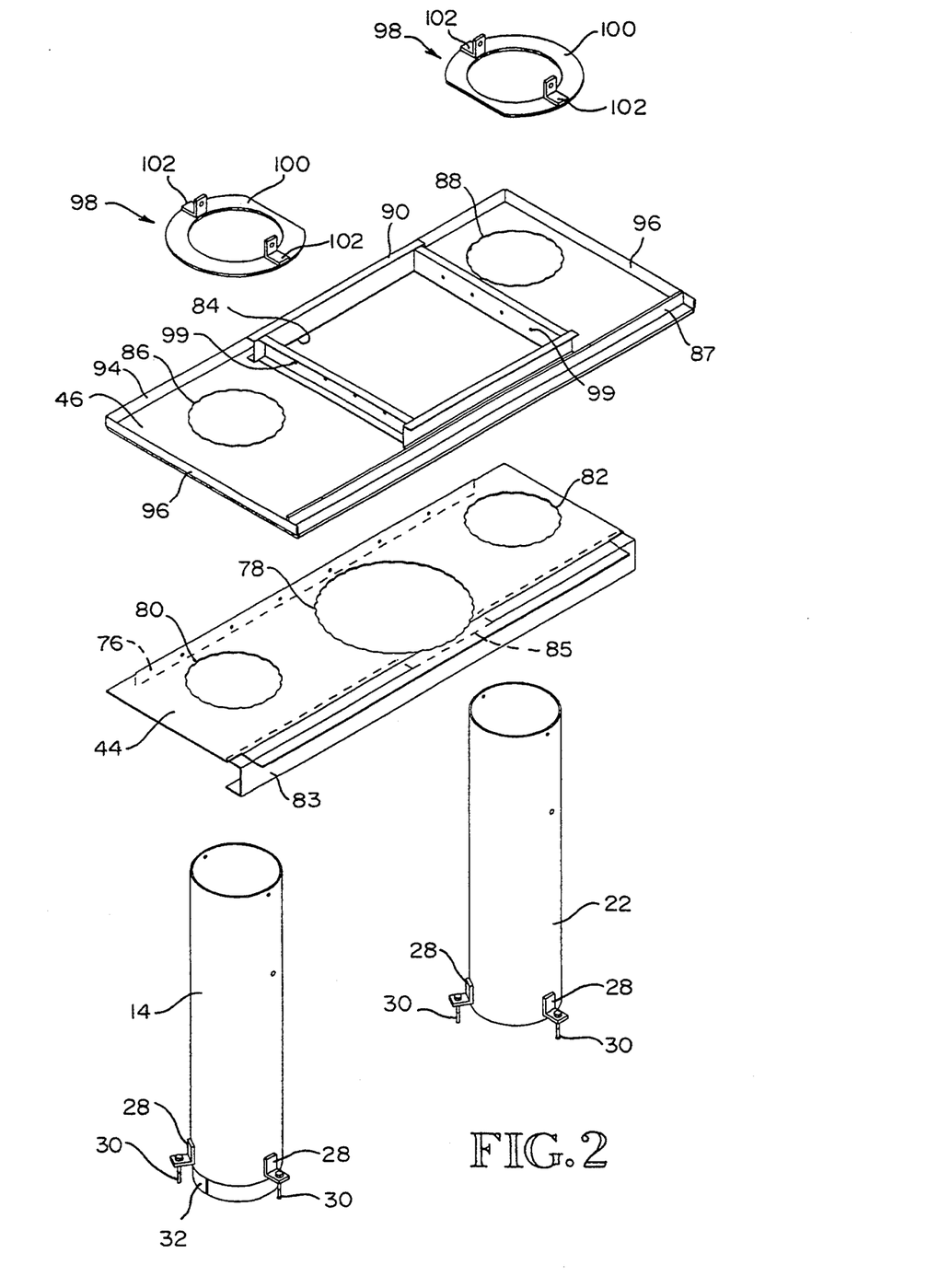
FIG. 2 is an exploded perspective view of the upper portion of the present invention.
Figure 3:
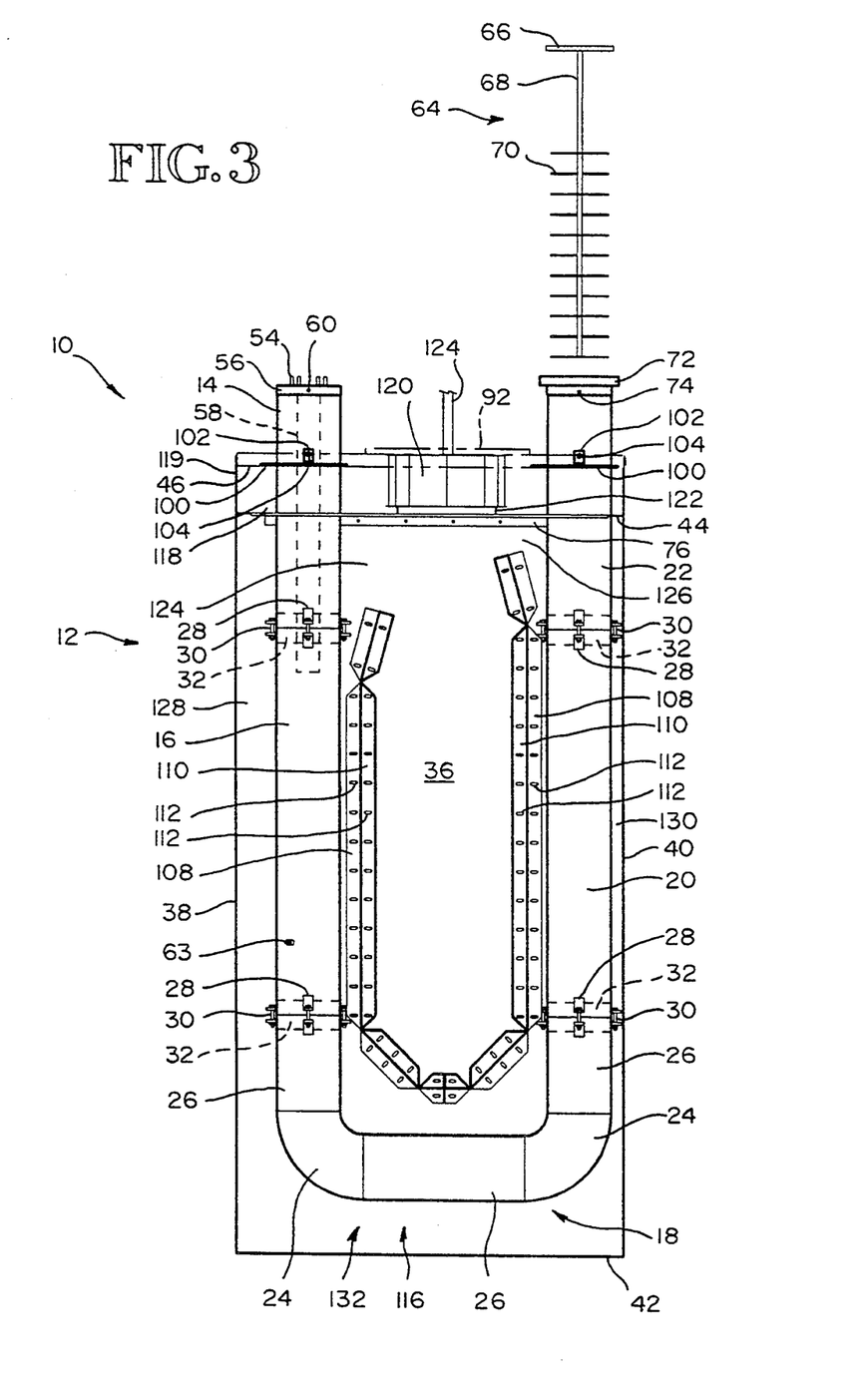
FIG. 3 is a front elevational view of the present invention.

As best seen in FIG. 3, the lower portions of the air control walls 48, 50 may be bent towards each other so that they abut each other, in order to force the air coming in through the front wall 34's air inlet holes 35 to flow through the U-shaped heater cavity 116, rather than between the air control walls 48, 50. The upper portions of the air control walls 48, 50 may be bent towards the blower closing plate 44's air inlet hole 78, in order to provide a low air resistance path between the left and right upper ends of the U-shaped heater cavity 116 and the air inlet hole 78. The air control walls 48, 50 may be secured to the heat exchanger 10's back wall in any suitable way, such as by the use of fasteners (not illustrated), which pass through the mounting holes 112 in the mounting flanges 108.

The heat exchanger 10's front wall 34 may include a pattern of air inlet holes 35; and may be secured in place in any suitable way. For example, the front wall 34 may be secured in place by the use of fasteners (not illustrated) which pass through corresponding fastener holes 62 in the front wall 34, and in the left, right and bottom walls 38-42. Fasteners (not illustrated), which pass through the front wall 34's centrally located fastener holes 114, and through the corresponding mounting holes 112 in the front flanges 110 of the air control panels 48, 50, may be used to help hold the front wall 34's central portion in place against the air control panels 48, 50. When the front wall 34 is assembled to the left, right and bottom walls 38-42, the top of the front wall 34 may be adjacent to the bottom of the blower closing plate 44's U-channel 83.

A generally U-shaped heater cavity 116 may be formed by the air control walls 48, 50; the bottom wall 42; the front wall 34; the blower closing plate 44; the U-channel 83; and the portions of the back, left and right walls 36-40 which are located below the blower closing plate 44.

A generally rectangular blower plenum 118 may be formed by the ceiling panel 46; the blower cover 92; the blower closing plate 44; and the portions of the back, left and right walls 36-40 which are located above the blower closing plate 44.

The blower plenum 118 may have an outlet 119 that is formed by the top of the front portion of the blower closing plate 44; the bottom of the front portion of the ceiling panel 46; and the front edges of the portions of the left and right walls 38, 40 which are located between the blower closing plate 44 and the ceiling panel 46.

Air may be forced through the heat exchanger 10 by any suitable blower means. For example, located within the blower plenum 118 may be a backward incline fan 120, having an air intake venturi or collar 122, whose bottom is about coplanar with the blower closing plate 44, as seen in FIG. 3. The fan 120 may be suspended from the drive shaft 124 of the motor 121; which, in turn, may be mounted to the exterior of the heat exchanger 10, or to any other suitable support structure. A drive shaft hole 115 may be provided in the blower cover 92, and a drive shaft mounting hole 117 may be provided in the fan 120.

Preferably, all or part of the heat exchanger 10 may be insulated in any suitable way, as may be indicated by the particular installation and intended use of the heat exchanger 10.

During use of the heat exchanger 10, the fan 120 may suck air into the heat exchanger 10 through the front wall 34's air inlet holes 35. The air inlet holes 35 may be arranged, as seen, so that all of the incoming air is initially directed over the hottest parts of the heat exchanger tube 12, namely the combustion area tube 16 and the U-shaped tube 18.

The incoming air may then be split by the air control walls 48, 50 into left and right hand portions. The left hand portion of the incoming air may pass up the left side of the U-shaped heater cavity 116, around the combustion area tube 16, and into the blower plenum 118 through the blower closing plate 44's air inlet hole 78. The right hand portion of the incoming air may pass up the right side of the U-shaped heater cavity 116, around the exhaust tube 22, and into the blower plenum 118 through the blower closing plate 44's air inlet hole 78. The fan 120 may then expel the heated air from the blower plenum 118 through its outlet 119. The heated air from the outlet 119 may then be expelled directly, or indirectly, into whatever device is being heated by the heat exchanger 10.

Preferably, the heat exchanger 10 may have a "balanced" air flow. That is, there may be no substantial resistance to the flow of air through the heat exchanger 10. For example, let it be assumed that a particular fan 120 and motor 121 combination are rated as being capable of delivering about 3600 cfm (cubic feet per minute) of air. Then if the heat exchanger 10 has a "balanced" air flow, that particular fan 120 and motor 121 combination may actually circulate about 3600 cfm of air through the heat exchanger 10. By way of comparison, some conventional heat exchangers have fan/motor combinations which are rated at about 4,600 to 5,800 cfm, and yet only actually circulate about 3600 cfm of air through their heat exchangers. As a result, it is seen that the heat exchanger 10 may be substantially more energy efficient than such conventional heat exchangers, since the heat exchanger 10 utilizes less energy to circulate the same number of cfm of air.

In general, the much lower internal air resistance of the heat exchanger 10, as compared to some conventional heat exchangers, may be due to such factors as: the blower plenum 118, which may be sized and shaped so as to not substantially restrict the exit of heated air from the fan 120; the heat exchanger tube 12 may be of a clean, finless design; and the air inlet holes 35, the heater cavity 116, the air inlet hole 78, and the blower plenum 118's outlet 119 are sized and shaped so as to not unduly restrict the passage of air therethrough.

By suitably adjusting the pertinent parameters, the heat exchanger 10 may provide precise control of the rate of air flow through it; the temperature of the heated air exiting from its blower plenum 118's outlet 119; and the efficiency with which heat is extracted from the fuel supplied to it.

The pertinent parameters may include, for example, the size, number and arrangement of the front wall 34's air inlet holes 35; the size and shape of the U-shaped heater cavity 116; the size and shape of the openings between the tops of the air control walls 48, 50 and the bottom of the blower closing plate 44; the size of the blower closing plate 44's air inlet hole 78; the size, shape and type of the fan 120; the size and shape of the blower plenum 118; the size and rpm of the fan 120's motor 121; and the size and shape of the blower plenum 118's outlet 119.

The above parameters may be suitably selected to provide a heat exchanger 10 with any desired air flow rate and heat delivery capacity.

By way of example, the heat exchanger 10 may supply a maximum of 300,000 BTUs (British Thermal Units) per hour; and may have an air flow rate of 3,600 cfm (cubic feet per minute) of heated air. Such a heat exchanger 10 may have the following parameters.

The heat exchanger tube 12 may have an overall maximum length of about $84\frac{1}{4}$ inches and a maximum overall width of about 35 inches. The inlet tube 14 and the exhaust tube 22 may each be about $25\frac{1}{4}$ inches long; the combustion area tube 16 and the exhaust tube 20 may each be about 40 inches long; and the U-shaped tube may be about 19 inches tall and about 35 inches wide. All of the tubes 14–22 may be made from any strong, durable, material which is resistant to heat and corrosion. For example, the combustion area tube 16 may be made from 10 gauge, type 304 stainless steel, while the rest of the tubes 14 and 18–22 may be made from 10 gauge mild steel. The tubes 14–22 may all have an internal diameter of about 6 inches.

The rest of the heat exchanger 10 may be made from any suitable durable, heat resistant material, such as sheet metal.

The internal alignment and sealing sleeves 32 may have an overall length of about 3 inches, an outer diameter of about 5.90 inches, and inner diameter of about 5.60 inches, and may extend out of their respective tubes 14–20 about 1½ inches when the tubes 14–22 are disassembled from each other.

The heat exchanger 10 may have an overall width of about 54 inches, as measured between its left and right walls 38, 40; and an overall height of about 82 inches, as measured between its bottom wall 42 and its ceiling panel 46.

The U-shaped heater cavity 116 may be about 75 inches high, as measured between the bottom wall 42 and the blower closing plate 44; and about 11 inches deep, as measured between the front and back walls 34, 36.

Preferably, since the combustion area tube 16 and the U-shaped tube 18 are hotter than the exhaust tubes 20, 22, greater cooling may be provided for the tubes 16, 18 by concentrating the front wall 34's air inlet holes 35 over the tubes 16, 18; by sizing the heater cavity 116's left side portion 128 and bottom portion 132 larger than its right side portion 130; and by sizing the heater cavity 116's left outlet 124 larger than its right outlet 132. For example, the forgoing elements 35 and 124–132 may be sized so that about ⅔ of the incoming air exits the heater cavity 116 through its left outlet 124, while about ⅓ of the incoming air exits through its right outlet 126.

In such a case the heater cavity 116's left outlet 124 may be about 10 inches tall, as measured between the top of the air control wall 48 and the bottom of the blower closing plate 44; its left side portion 128 may be about 13.5 inches wide, as measured between the left wall 38 and the burner side air control wall 48; its bottom portion 132 may be about 15.25 inches high, as measured between the bottom wall 42 and the bottom portions of the air control walls 48, 50; its right side portion 130 may be about 11.25 inches wide, as measured between the right wall 40 and the exhaust side air control wall 50; and its right outlet 126 may be about 4.5 inches tall, as measured between the top of the exhaust side air control wall 50 and the bottom of the blower closing plate 44.

The blower plenum 118 may be about 7 inches high, as measured between the blower closing plate 44 and the ceiling panel 46; about 54 inches wide, as measured between the left and right walls 38, 40; and about 11 inches deep, as measured between the back wall 36 and the plane of the front wall 34.

The fan 120 may be a backward incline fan having an external diameter of about 15 inches; an air intake having a diameter of about 9 inches; and 9 vanes, each about 5 inches long. When driven by a motor 121 of about 1.5 h.p., at about 1,725 rpm, the fan 120 will deliver about 3,600 cfm of air.

The heat exchanger 10 may be used to supply heat to any device, such as a commercial baking oven, for example. For compactness and simplicity, the heat exchanger 10 may form part, or all, of one or more of the walls of the oven or other device to which it is to supply heat. In such a case, the heat exchanger 10's front wall 34, and its air inlet holes 35, may be exposed to the cavity inside the oven or other device, so that the air within the cavity may be sucked out through the air inlet holes 35 to be heated by the heat exchanger tube 12; while the heated air may be expelled into the cavity from the blower plenum 118's outlet 119, either directly, or indirectly through conduit means, in any suitable way.

Any suitable temperature control means may be used to sense the temperature within the cavity inside the oven or other device, and to regulate the heat exchanger 10 to maintain the desired temperature within the cavity. Such regulation may comprise, for example, periodically turning on and off the fuel/air input equipment which is connected to the heat exchanger 10's mounting member 52, or adjusting the amount of fuel/air mixture which the fuel/air input equipment delivers to the heat exchanger 10.

It is understood that the foregoing forms of the invention were described and/or illustrated strictly by way of non-limiting example.

In view of all of the disclosures herein, these and further modifications, adaptations and variations of the present invention will now be apparent to those skilled in the art to which it pertains, within the scope of the following claims.

What is claimed is:

1. A heat exchanger for use with a baking or cooking oven comprising: at least one heat exchanger tube which comprises an inlet end portion, an outlet end portion, and an intermediate portion that is located between said inlet and outlet end portions; wherein said heat exchanger tube comprises at least two modular component tubes; wherein each said modular component tube has an upstream end and a downstream end with respect to a flow of hot fluid within said heat exchanger tube during use of said heat exchanger; wherein said heat exchanger tube further comprises assembly means for releasably aligning, sealing and connecting together at least said downstream end of a first said modular component tube and said upstream end of a second said modular component tube; wherein said assembly means are also for permitting at least said first and second modular component tubes to be easily disassembled from each other, to enable at least one of said first and second modular component tubes to be removed from said heat exchanger tube for repair and replacement; wherein at least one of said assembly means comprises an internal alignment and sealing sleeve; wherein said internal alignment and sealing sleeve is sized to fit within, align and seal said upstream end of said second modular component tube with respect to said downstream end of said first modular component tube; wherein said at least one of said assembly means further comprises external fastener means for releasably holding together said downstream end of said first modular component tube and said upstream end of said second modular component tube; wherein said internal alignment and sealing sleeve has an upstream end and a downstream end with respect to said flow of hot fluid within said heat exchanger tube; wherein said sleeve's upstream end is welded to said downstream end of said first modular component tube; wherein said sleeve's downstream end is sized to fit snugly within said upstream end of said second modular component tube; wherein before said internal alignment and sealing sleeve is heated in said heat exchanger tube for a first time, said internal alignment and sealing sleeve incorporates manufacturing stresses; wherein said manufacturing stresses are automatically and permanently at least partially relieved by heat received by said internal alignment and sealing sleeve from said flow of hot fluid within said heat exchanger tube, to cause said internal alignment and sealing sleeve to automatically and permanently expand to some degree, to automatically and permanently increase a sealing contact of said internal alignment and sealing sleeve with said upstream end of said second modular component tube, until said first and second modular component tubes are disassembled from each other; and wherein said heat exchanger further comprises a heat exchanger tube housing means for defining a heater cavity, and for housing at least a portion of said heat exchanger tube within said heater cavity; wherein said heat exchanger further comprises means for conecting said heat exchanger to said baking or cooking oven; wherein said housing means comprise top, bottom and side walls which define said heater cavity; wherein said top wall defines two heat exchanger tube holes; wherein said heat exchanger tube is at least generally U-shaped, in that its said intermediate portion is bent at least sufficiently to permit both of its said inlet and outlet end portions to pass though a respective one of said heat exchanger tube holes in said top wall; wherein said heat exchanger further comprises air inlet means for permitting air to enter said heater cavity; air outlet means for permitting air to exit from said heater cavity; and blower means for circulating air into said heater cavity through said air inlet means, around said portion of said heat exchanger tube within said heater cavity, and out through said air outlet means; wherein said heat exchanger tube experiences repeated thermal cycles during use of said heat exchanger; wherein each of said thermal cycles causes expansion of said heat exchanger tube as it heats up, and contraction of said heat exchanger tube as it cools down; wherein said heat exchanger further comprises heat exchanger tube support means for suspending said at least one heat exchanger tube from said housing means' top wall; wherein said heat exchanger tube support means are also for permitting said heat exchanger tube to freely move with respect to said heat exchanger tube housing means during said expansion and contraction of said heat exchanger tube during said thermal cycles, to help prevent stress cracking of said heat exchanger tube which might otherwise be caused by said expansion and contraction of said heat exchanger tube during said thermal cycles; wherein said heat exchanger tube support means comprises a pair of hangers; wherein each of said hangers is secured to a respective one of said heat exchanger tube's inlet and outlet end portions; wherein each of said hangers rests on top of said top wall; and wherein each of said hangers is not affixed to said top wall.

2. A heat exchanger for use with a baking or cooking oven comprising: at least one heat exchanger tube which comprises an inlet end portion, an outlet end portion, and an intermediate portion that is located between said inlet and outlet end portions; and wherein said heat exchanger further comprises a heat exchanger tube housing means for defining a heater cavity and for housing at least a portion of said heat exchanger tube within said heater cavity; wherein said heat exchanger further comprises means for conecting said heat exchanger to said baking or cooking oven; wherein said housing means comprise top, bottom and side walls which define said heater cavity; wherein said top wall defines two heat exchanger tube holes; wherein said heat exchanger tube is at least generally U-shaped, in that its said intermediate portion is bent at least sufficiently to permit both of its said inlet and outlet end portions to pass though a respective one of said heat exchanger tube holes in said top wall; wherein said heat exchanger further comprises air inlet means for permitting air to enter said heater cavity; air outlet means for permitting air to exit from said heater cavity; and blower means for circulating air into said heater cavity through said air inlet means, around said portion of said heat exchanger tube within said heater cavity, and out through said air outlet means; wherein said heat exchanger tube experiences repeated thermal cycles during use of said heat exchanger; wherein each of said thermal cycles causes expansion of said heat exchanger tube as it heats up, and contraction of said heat exchanger tube as it cools down; wherein said heat exchanger further comprises heat exchanger tube support means for suspending said at least one heat exchanger tube from said housing means' top wall; wherein said heat exchanger tube support means are also for permitting said heat exchanger tube to freely move with respect to said heat exchanger tube housing means during said expansion and contraction of said heat exchanger tube during said thermal cycles, to help prevent stress cracking of said heat exchanger tube which might otherwise be caused by said expansion and contraction of said heat exchanger tube during said thermal cycles; wherein said heat exchanger tube support means comprises a pair of hangers; wherein each of said hangers is secured to a respective one of said heat exchanger tube's inlet and outlet end portions; wherein each of said hangers rests on top of said top wall; and wherein each of said hangers is not affixed to said top wall.

3. A heat exchanger for use with a baking or cooking oven comprising: at least one heat exchanger tube which comprises an inlet end portion, an outlet end portion, and an intermediate portion that is located between said inlet and outlet end portions; wherein said heat exchanger tube comprises at least two modular component tubes; wherein each said modular component tube has an upstream end and a downstream end with respect to a flow of hot fluid within said heat exchanger tube during use of said heat exchanger; wherein said heat exchanger tube further comprises assembly means for releasably aligning, sealing and connecting together at least said downstream end of a first said modular component tube and said upstream end of a second said modular component tube; wherein said assembly means are also for permitting at least said first and second modular component tubes to be easily disassembled from each other, to enable at least one of said first and second modular component tubes to be removed from said heat exchanger tube for repair and replacement; wherein at least one of said assembly means comprises an internal alignment and sealing sleeve; wherein said internal alignment and sealing sleeve is sized to fit within, align and seal said upstream end of said second modular component tube with respect to said downstream end of said first modular component tube; wherein said at least one of said assembly means further comprises external fastener means for releasably holding together said downstream end of said first modular component tube and said upstream end of said second modular component tube; wherein said internal alignment and sealing sleeve has an upstream end and a downstream end with respect to said flow of hot fluid within said heat exchanger tube; wherein said sleeve's upstream end is welded to said downstream end of said first modular component tube; wherein said sleeve's downstream end is sized to fit snugly within said upstream end of said second modular component tube; wherein before said internal alignment and sealing sleeve is heated in said heat exchanger tube for a first time, said internal alignment and sealing sleeve incorporates manufacturing stresses; wherein said manufacturing stresses are automatically and permanently at least partially relieved by heat received by said internal alignment and sealing sleeve from said flow of hot fluid within said heat exchanger tube, to cause said internal alignment and sealing sleeve to automatically and permanently expand to some degree, to automatically and permanently increase a sealing contact of said internal alignment and sealing sleeve with said upstream end of said second modular component tube, until said first and second modular component tubes are disassembled from each other; wherein said heat exchanger further comprises a heat exchanger tube housing means for defining a heater cavity and for housing at least a part of said heat exchanger tube within said heater cavity wherein said heat exchanger further comprises means for conecting said heat exchanger to said baking or cooking oven.

4. A heat exchanger comprising: at least one heat exchanger for use with a cooking or baking oven tube; and a heat exchanger tube housing means for defining a heater cavity, and for housing at least a portion of said heat exchanger tube within said heater cavity; wherein said housing means further comprises air inlet means for permitting air to enter said heater cavity; air outlet means for permitting air to exit from said heater cavity; and blower means for circulating air into said heater cavity through said air inlet means, around said portion of said heat exchanger tube within said heater cavity, and out through said air outlet means; wherein said air inlet means are located over a hottest part of said heat exchanger tube; wherein said heat exchanger further comprises means for connecting said heat exchanger to said baking or cooking oven; wherein said heat exchanger tube experiences repeated thermal cycles during use of said heat exchanger; wherein each of said thermal cycles causes expansion of said heat exchanger tube as it heats up, and contraction of said heat exchanger tube as it cools down; wherein said heat exchanger further comprises heat exchanger tube support means for supporting said at least one heat exchanger tube with respect to said heat exchanger tube housing means; and wherein said heat exchanger tube support means are also for permitting said heat exchanger tube to freely move with respect to said heat exchanger tube housing means during said expansion and contraction of said heat exchanger tube during said thermal cycles, to help prevent stress cracking of said heat exchanger tube which might otherwise be caused by said expansion and contraction of said heat exchanger tube during said thermal cycles.

5. The heat exchanger according to claim 4, wherein said housing means comprise top, bottom and side walls which define said heater cavity; and wherein said heat exchanger tube support means are for suspending said heat exchanger tube from said top wall.

6. The heat exchanger according to claim 5, wherein said heat exchanger tube comprises inlet and outlet end portions; and wherein said heat exchanger tube support means suspend said heat exchanger tube from said top wall by at least one of said inlet and outlet end portions.

7. The heat exchanger according to claim 6, wherein said top wall defines two heat exchanger tube holes; wherein heat exchanger tube is bent at least sufficiently to permit both of its said inlet and outlet end portions to pass through a respective one of said heat exchanger tube holes in said top wall.

8. The heat exchanger according to claim 7, wherein said heat exchanger tube support means comprises at least one hanger; wherein said at least one hanger is secured to a respective one of said heat exchanger tube's inlet and outlet end portions; wherein said at least one hanger rests on top of said top wall; and wherein said at least one hanger is not affixed to said top wall.

9. The heat exchanger according to claim 8, wherein there are two of said hangers; wherein each of said hangers is secured to a respective one of said heat exchanger tube's inlet and outlet end portions; wherein each of said hangers rests on top of said top wall; and wherein each of said hangers is not affixed to said top wall.

10. The heat exchanger according to claim 4, wherein said heat exchanger tube comprises at least two modular component tubes; wherein each said modular component tube has an upstream end and a downstream end with respect to a flow of hot fluid within said heat exchanger tube during use of said heat exchanger; wherein said heat exchanger tube further comprises assembly means for releasably aligning, sealing and connecting together at least said downstream end of a first said modular component tube and said upstream end of a second said modular component tube; and wherein said assembly means are also for permitting at least said first and second modular component tubes to be easily disassembled from each other, to enable at least one of said first and second modular component tubes to be removed from said heat exchanger tube for repair and replacement.

11. The heat exchanger according to claim 10, wherein at least one of said assembly means comprises an internal alignment and sealing sleeve; wherein said internal alignment and sealing sleeve is sized to fit within, align and seal said upstream end of said second modular component tube with respect to said downstream end of said first modular component tube; and wherein said at least one of said assembly means further comprises external fastener means for releasably holding together said downstream end of said first modular component tube and said upstream end of said second modular component tube.

12. The heat exchanger according to claim 11, wherein said internal alignment and sealing sleeve has an upstream end and a downstream end with respect to said flow of hot fluid within said heat exchanger tube; wherein said sleeve's upstream end is welded to said downstream end of said first modular component tube; and wherein said sleeve's downstream end is sized to fit snugly within said upstream end of said second modular component tube.

13. The heat exchanger according to claim 12, wherein before said internal alignment and sealing sleeve is heated in said heat exchanger tube for a first time, said internal alignment and sealing sleeve incorporates manufacturing stresses; and wherein said manufacturing stresses are automatically and permanently at least partially relieved by heat received by said internal alignment and sealing sleeve from said flow of hot fluid within said heat exchanger tube, to cause said internal alignment and sealing sleeve to automatically and permanently expand to some degree, to automatically and permanently increase a sealing contact of said internal alignment and sealing sleeve with said upstream end of said second modular component tube, until said first and second modular component tubes are disassembled from each other.

14. The heat exchanger according to claim 4, wherein a flow of hot combustion gasses from the burning of a fuel exists in said heat exchanger tube during operation of said heat exchanger; and wherein said heat exchanger tube further comprises secondary ignition means located in said flow of hot combustion gasses, for aiding in more complete combustion of said fuel within said heat exchanger tube.

15. The heat exchanger according to claim 14, wherein said secondary ignition means are passive, in that said secondary ignition means are heated to an incandescent operating temperature by said flow of hot combustion gasses within said heat exchanger tube.

16. The heat exchanger according to claim 14, wherein said secondary ignition means comprise at least one rod; and wherein said heat exchanger further comprises mounting means for mounting said at least one rod within said heat exchanger tube.

* * * * *